(12) United States Patent
Izard

(10) Patent No.: US 6,353,205 B1
(45) Date of Patent: Mar. 5, 2002

(54) LASER CUT SAW BLADES

(75) Inventor: Nowell William Izard, Masterton (NZ)

(73) Assignee: Click Clack Limited, Palmerston North (NZ)

( * ) Notice: Subject to any disclaimer, the term of this patent is extended or adjusted under 35 U.S.C. 154(b) by 0 days.

(21) Appl. No.: 09/673,662

(22) PCT Filed: May 6, 1999

(86) PCT No.: PCT/NZ99/00058
§ 371 Date: Dec. 15, 2000
§ 102(e) Date: Dec. 15, 2000

(87) PCT Pub. No.: WO99/56904
PCT Pub. Date: Nov. 11, 1999

(30) Foreign Application Priority Data

May 6, 1998 (NZ) ................................................ 330374

(51) Int. Cl.$^7$ ............................................. B23K 26/00
(52) U.S. Cl. .......................... 219/121.72; 219/121.7; 219/121.68; 51/295
(58) Field of Search ...................... 219/121.72, 121.7, 219/121.6, 121.73, 121.85, 121.68, 121.69; 51/295; 451/541, 542, 543; 205/122, 124, 218

(56) References Cited

U.S. PATENT DOCUMENTS

| | | | |
|---|---|---|---|
| 4,412,120 A | | 10/1983 | Duruz et al. |
| 4,488,882 A | * | 12/1984 | Dausinger et al. |
| 4,495,398 A | * | 1/1985 | Bredow et al. |
| 4,641,007 A | * | 2/1987 | Lach |
| 5,226,404 A | * | 7/1993 | Mogi et al. |
| 5,471,970 A | * | 12/1995 | Sakarcan |
| 6,110,031 A | * | 8/2000 | Preston et al. |
| 6,273,082 B1 | * | 8/2001 | Tselesin |

FOREIGN PATENT DOCUMENTS

| | | | |
|---|---|---|---|
| GB | 2 088 267 | | 6/1982 |
| GB | 32 17 362 | | 8/1983 |
| WO | WO 85/00280 | * | 1/1985 |

OTHER PUBLICATIONS

Patent Abstracts of Japan, JP 60–135116, Jul. 18, 1985.

* cited by examiner

Primary Examiner—Tom Dunn
Assistant Examiner—Jonathan Johnson
(74) Attorney, Agent, or Firm—Oblon, Spivak, McClelland, Maier & Neustadt, P.C.

(57) ABSTRACT

A method of manufacturing a tungsten carbide tipped circular saw blade (S) characterised by the steps: (a) supplying a stainless sheet steel strip or blank to a laser cutting machine; (b) laser Cutting an arbor (11) and the periphery profile of the blade (S) according to a predetermined computer controlled pattern; (c) brazing the tungsten carbide saw tips to their respective locations on the periphery of the blade (S); (d) electropolishing the blade (S) to remove brazing residues and heat discolouration from the surfaces; and (e) grinding the final cutting profile to each of the tungsten carbide tips.

11 Claims, 5 Drawing Sheets

LASER CUT SAW BLADES

Figure 1:
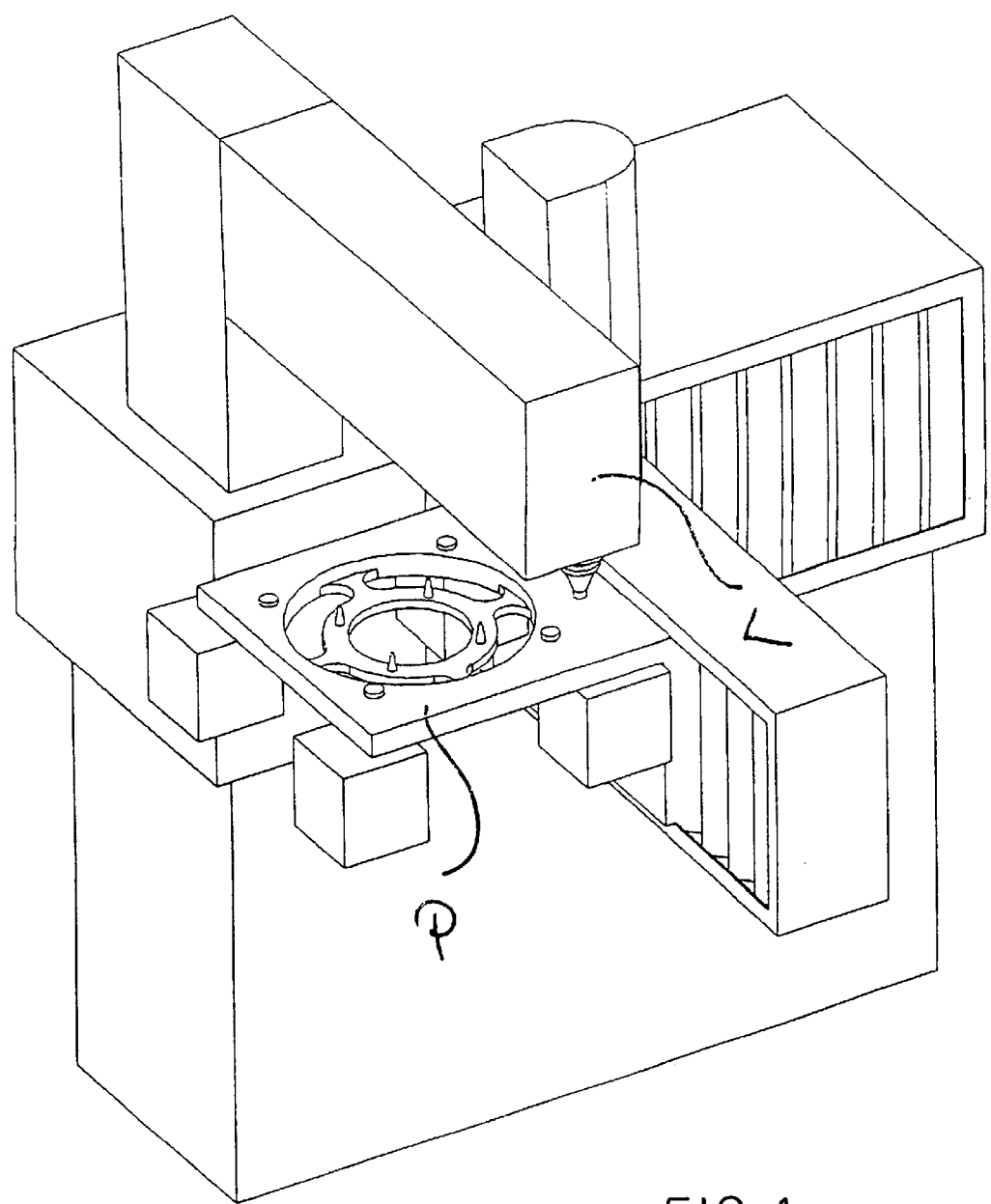

This invention relates to improvements in laser cut saw blades.

This invention relates to a tungsten carbide tipped circular saw blade, and an improved method for making the same.

The fabrication of tungsten carbide tipped circular saw blades is a time consuming and expensive process. With the advent of laser cutting equipment, a typical 7¼ inch (184 mm) saw blade can be cut out in about one minute. Because of the variety of machines which use these blades, it is often necessary to provide blades with different sized arbors, which suit the particular machines for which they are supplied. So far as circular arbors are concerned, it is usual to make the blade with the largest sized arbor typically 30 mm and then provide a series of collars to cater for other sizes.

Certain markets such as the United States require arbors that are diamond shaped and these have been particularly hard to provide to date.

To date, all circular saw bodies have been made from carbon steel which has a tendency to rust when exposed to moisture. It is seen as extremely desirable if a saw blade body could be completely made from a rust resistant material such as stainless steel. To date, it has not been possible to achieve this because substituting stainless steel for carbon steel in the conventional saw blade fabrication process results in a product that has an unsatisfactory surface finish (severely discoloured) and is not suitable for presentation to the buying public.

Clearly, it would be advantageous if a method could be found to produce a tungsten carbide tipped circular saw with a rust resistant stainless steel body. It would also be advantageous if a method could be found to provide for the different shaped arbors when manufacturing the blade so that additional items such as adaptation collars are no longer necessary.

It is believed that the present invention provides for these wishes and has further additional advantages.

The invention provides a method of manufacturing a tungsten carbide tipped circular saw blade characterised by the steps:

(a) supplying a stainless sheet steel strip or blank to a laser cutting machine;

(b) laser cutting an arbor and the periphery profile of the blade according to a predetermined computer controlled pattern;

(c) brazing the tungsten carbide saw tips to their respective locations on the periphery of the blade;

(d) electropolishing the blade to remove brazing residues and heat discolouration from the surfaces; and (e) grinding the final cutting profile to each of the tungsten carbide tips.

Preferably a number of different sized arbors are cut by the laser at the time of manufacture said arbors each being retained by tags which hold each cut arbor portion to the main body of the saw blade. Optionally heat expansion slots/patterns may also be cut by the laser at the time of manufacture.

In a preferred embodiment, the process of step (b) is performed with the aid of nitrogen gas to provide a clean non-carbonized cut.

The invention also provides a tungsten carbide tipped circular saw blade made in accordance with the method described above.

Figure 2:
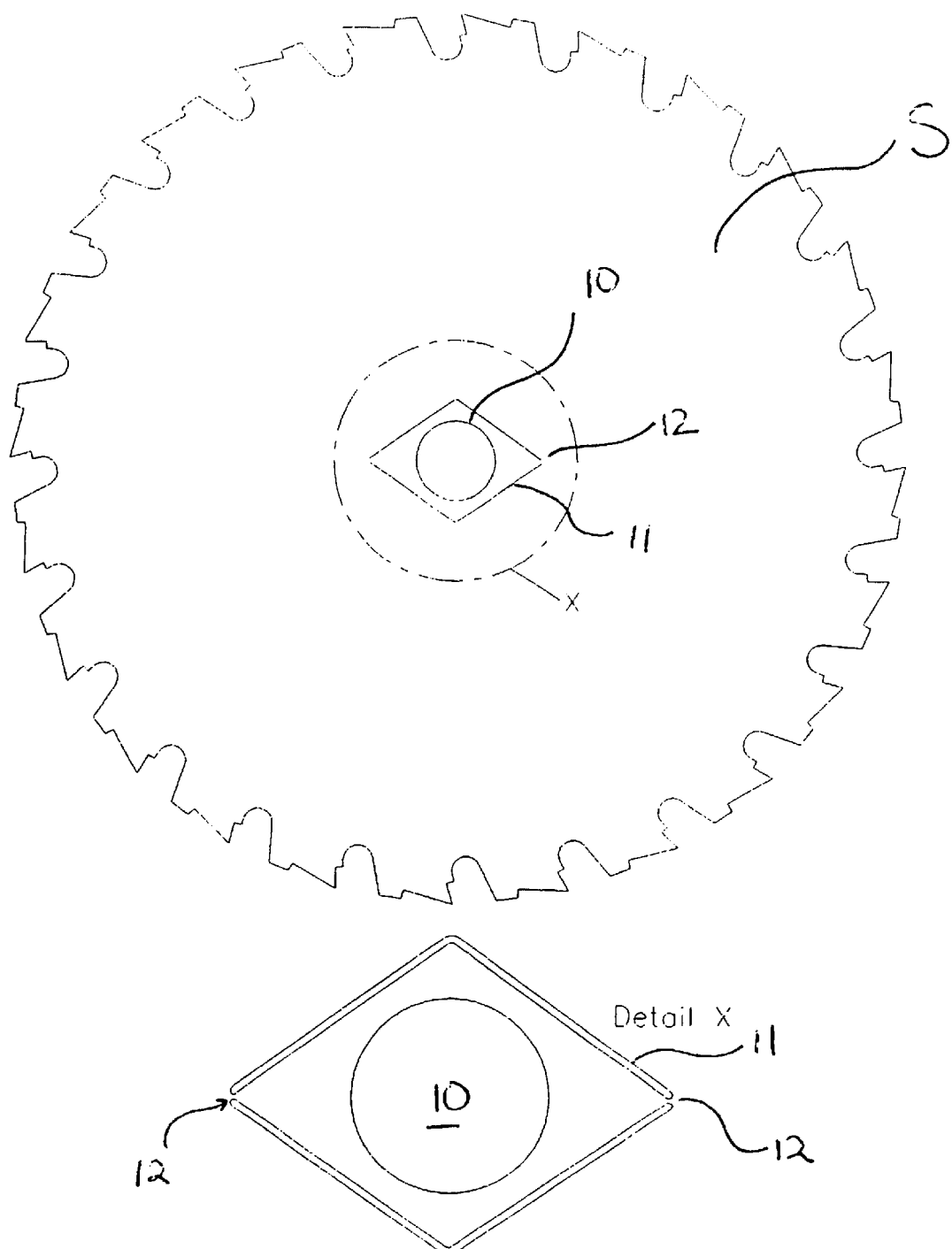
Figure 3:
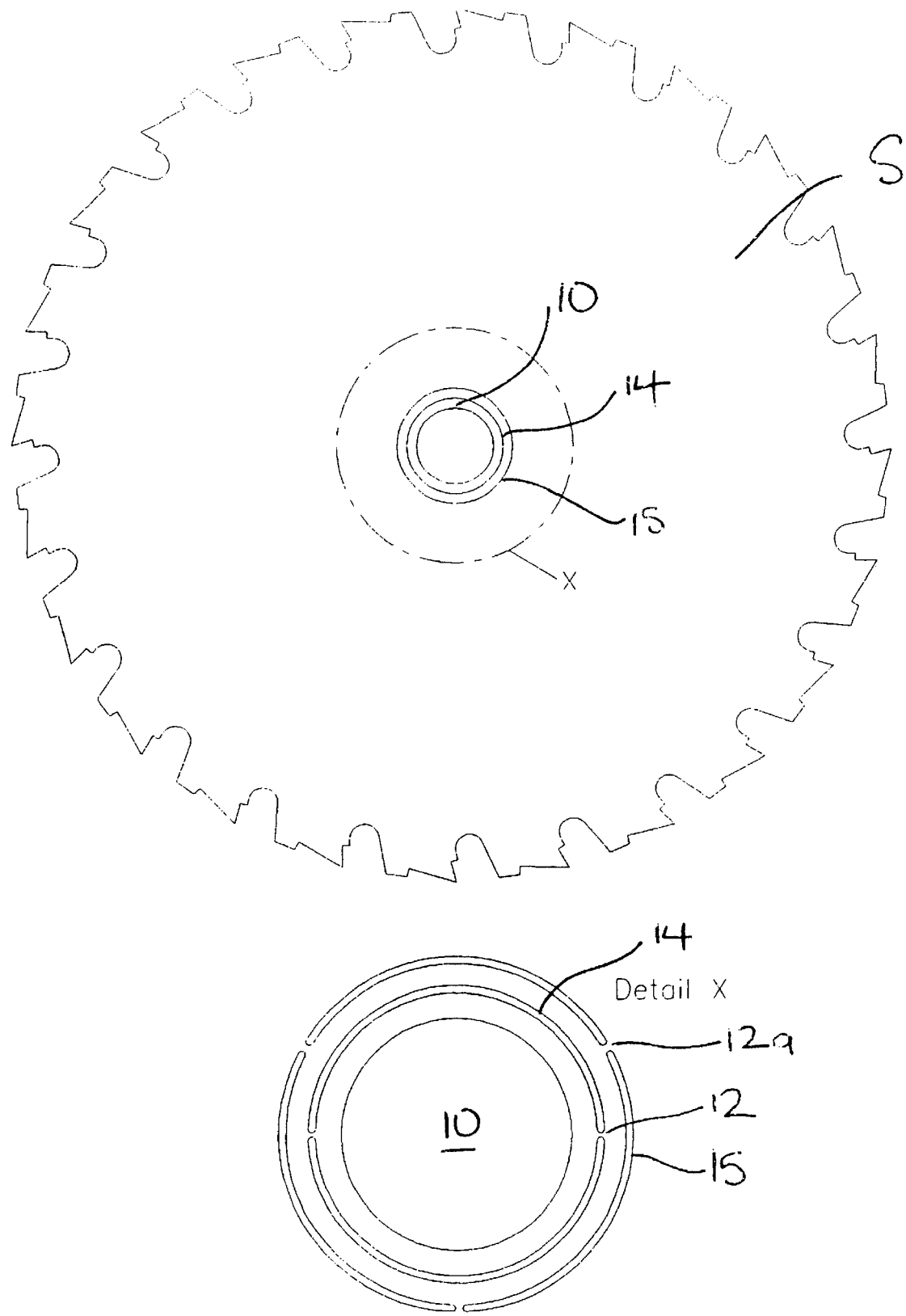
Figure 4:
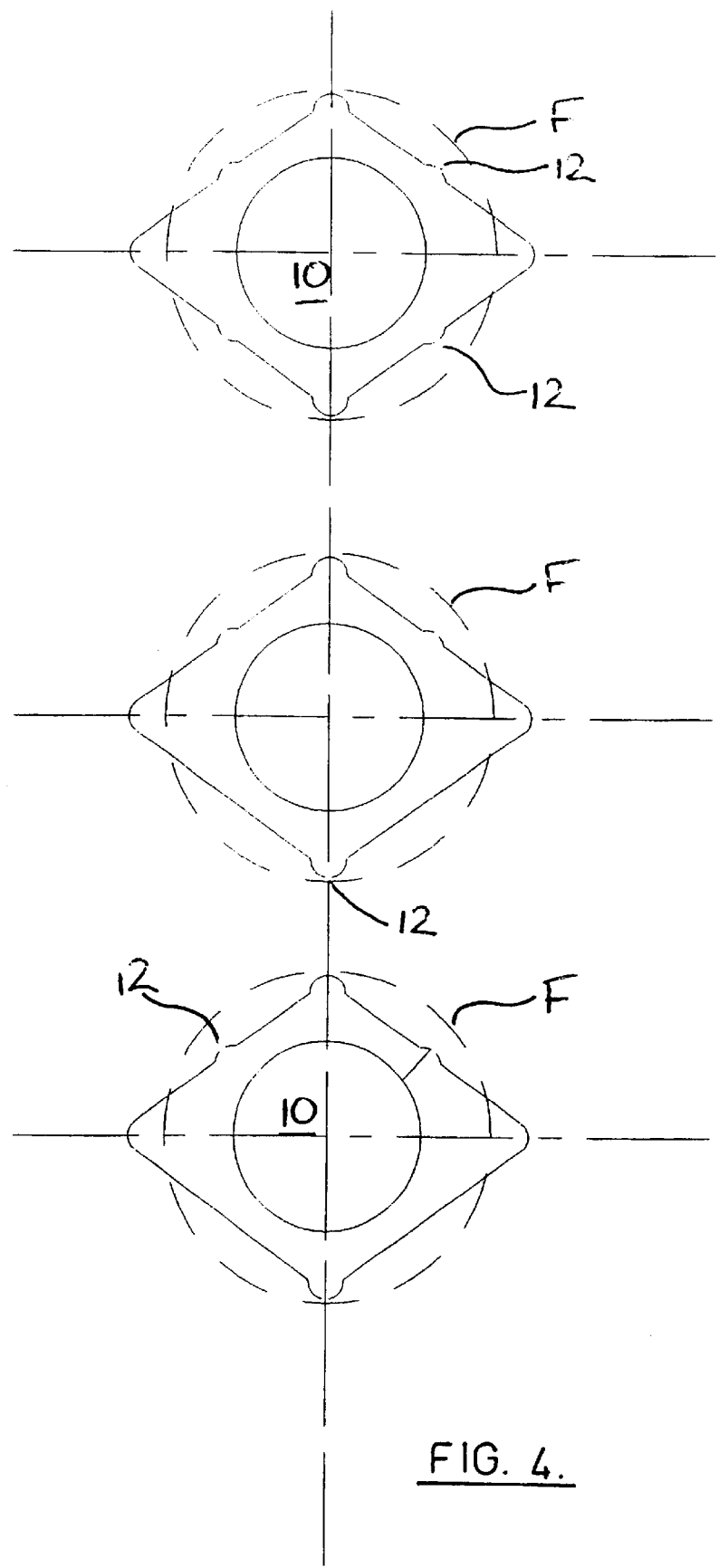
Figure 5:
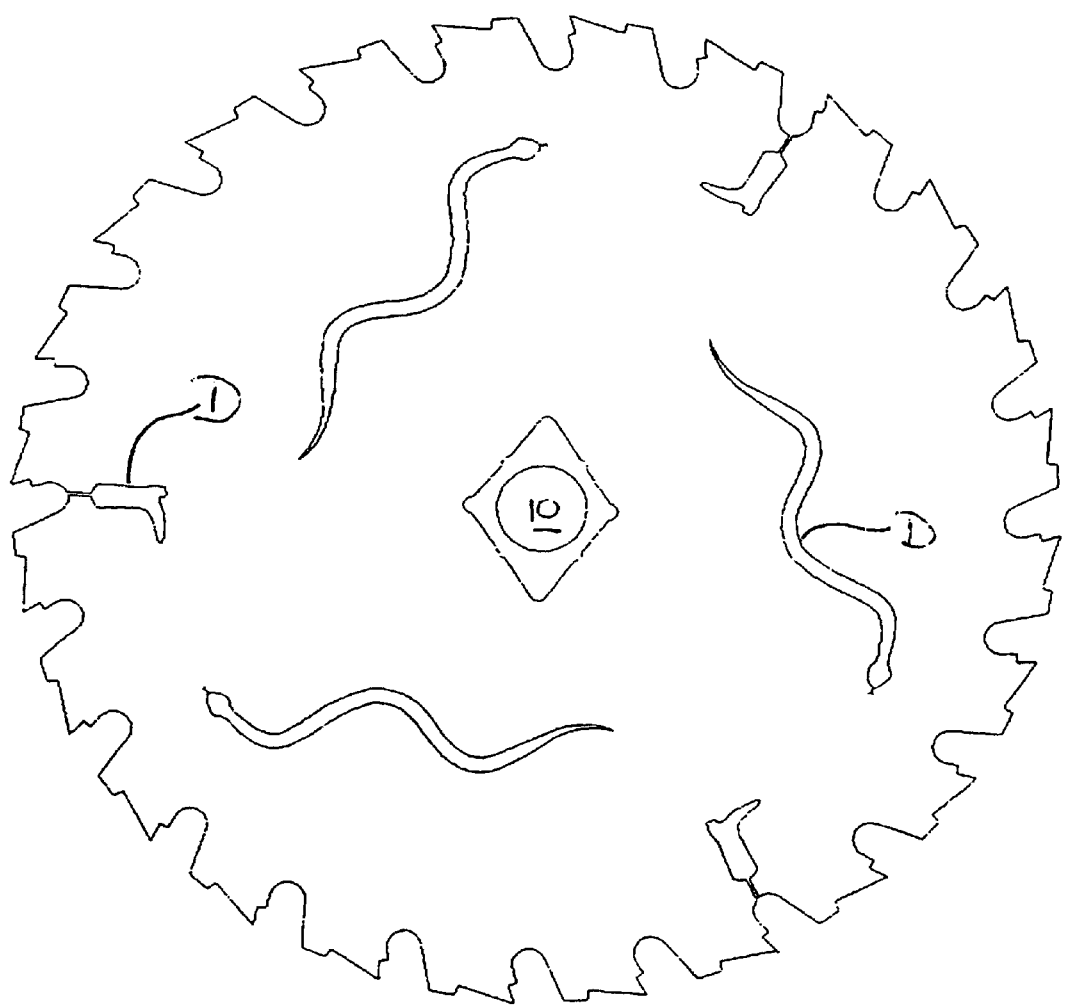

In further describing the invention according to a preferred embodiment, reference will be made to the accompanying drawings in which:

FIG. 1: is a perspective schematic view of a laser cutting apparatus suitable for performing the invention, FIG. 2: is a elevational view of a circular saw body provided with circular arbors, FIG. 3: is an elevational view of a saw blade body having circular and diamond shaped arbors, FIG. 4: is an elevational view of alternative arbor shapes, and FIG. 5: is an elevational view of a circular saw body with decorative cutouts.

Referring to FIG. 1 of the drawings, there is shown in schematic form an apparatus for laser cutting saw blades. The components of the apparatus are conventional except for the fact that the laser-cutting head L is fixed or substantially fixed and the platen P is designed to move. In conventional apparatus, the platen is fixed and the laser head moves according to the computer controlled predetermined pattern. In a conventional apparatus with a moving laser head, it has been found that a typical saw body takes about 60 seconds to cut out. This is because movement of the laser head is limited by its inertia, and because it has fragile components it is subject a maximum of about 1–2 G of acceleration. With an apparatus in which the platen moves, it has been found that because of its inherently lower inertia, and its ability to be moved through a greater range of motions and accelerations the time taken to cut out the saw body can be reduced to about 10 seconds.

Referring to FIG. 2 of the drawings, there is shown a saw blade S having a conventional 16 mm arbor 10 and a knock out diamond shaped arbor 11. Referring to the detailed enlargement, the diamond arbor portion 11 is retained on to the body portion by means of one, two, three, four or more tags 12. The cutting laser cuts the diamond arbor and the tags 12 are large enough to provide sufficient strength for the blade to function when used with the circular arbor 10. In any event, most saws use a locking flange F, which would substantially cover the portion of the blade beyond the diamond shaped or enlarged arbor 12 so that strength of the tags is not necessarily a critical factor.

Referring to FIG. 3 of the drawings, there is shown a saw blade S having a conventional 16 mm arbor 10 and a knock out arbor for alternative circular arbor sizes such as 25 and 30 mm (14,15). It has been found that the tag portions 12,12a holding the alternative arbors 14,15 can be increased for each larger size to ensure that the least diameter arbor (14 in this case) is knocked out in preference to the larger diameter (15 in this case).

Referring to FIG. 5, the saw blade may include decorative cut-outs D of any desired shape.

The saw body is made from stainless steel sheet and optionally hardened. The advantages of this material is that it is naturally rust resistant, and with the use of electropolishing (reverse electroplating) gives a near mirror, low friction and aesthetically appealing finish. It is surprising and unexpected that the electropolishing process removes the residue brazing fluxes, other residues and associated heat discolourations and marks.

EXAMPLE

The first step involves the selection of the base material, in this example coils of 300 or 400 series stainless steel which weigh, 5–10 tons and have a gauge of 1 mm to 2 mm depending on the end product. The coils measure approx. 1216 mm wide and are pre-hardened to a suitable Rockwell hardness for saw Blades, typically 36–44 RC. The coils are then split down to size, stress relieved, flattened and cut into squares to approximately the size of the saw blade to be produced. This is done using multi-directional levelling rollers.

The square blanks are then checked for flatness before laser cutting takes place. In the event that the square blanks are not flat or suitably stress relieved before laser cutting, the banks will be placed into an electrical blast furnace while being pressure clamped and brought up to a temperature ranging between the 205 to 480 degrees Celsius to effect stress relief and flattening.

In the second step the arbor and blade periphery are cut from the stainless steel blanks using a high powered $CO_2$ laser using pure nitrogen as an assist gas, to give a clean non-carbonised cut. This means that there is no need to clean the saw tip pockets with a sand blaster or grinding wheel which would otherwise be necessary for the next step of brazing the carbide tips in place.

The next step is brazing the tungsten carbide saw tips onto the periphery of the saw body which is done by using proprietary automatic brazing machines suitable for saw blade production. The heat source for brazing in this case is a gas flame, but induction, TIG or even lasers can be used for this purpose. Brazing is completed using a silver based filler metal and a brazing flux to make the brazed bond good and strong.

The next step comprises the electropolishing process. This is done at this point to clean up the brazing marks left behind after the brazing process, and to polish the saw body to a suitable shiny finish. This process is unique to stainless steel, thus avoiding the processes associated with carbon steel that require sand blasting the brazed area and polishing or finishing mechanically, to make the saw body presentable. The carbon steel saw then requires the application of a rust preventative coating to stop corrosion. Stainless steel saws do not require these processes. The electropolishing is done by immersing the saw blades into various tanks and in which the primary tank contains an electrolyte fluid (Electropol SS 92). An electric current is passed through from the saw blades to the walls of the electro-tank, thus removing the brazing soot and heat marks and polishing the saws at the same time. The power source is a 300 amp low voltage rectifier.

In the next step, the tungsten carbide tips of the cleaned and polished brazed blades are ground using an automatic diamond wheel grinding machine. The reason the carbide saw tips are sharpened after electropolishing is that the electropolishing dulls the carbide, eating at the binding material in the matrix of the carbide tip. Grinding after polishing produces a shiny sharp saw tip.

The final step is inspection and packaging of the finished product.

It will be appreciated that the above description is by way of example only and alternative process steps are envisaged within the scope of the appended claims.

What is claimed is:

1. A method of manufacturing a tungsten carbide tipped circular saw blade characterised by the steps:
    (a) supplying a stainless sheet steel strip or blank to a laser cutting machine;
    (b) laser cutting an arbor and the periphery profile of the blade according to a predetermined computer controlled pattern;
    (c) brazing the tungsten carbide saw tips to their respective locations on the periphery of the blade;
    (d) electropolishing the blade to remove brazing residues and heat discolouration from the surfaces; and
    (e) grinding the final cutting profile to each of the tungsten carbide tips.

2. A method according to claim 1 wherein the laser cutting of step (b) is performed with the aid of nitrogen gas.

3. A method according to claim 1 wherein one or more additional alternative arbors are cut in the laser cutting of step (b) each said additional arbor being retained to the blade by one or more tag portions.

4. A method according to claim 1 wherein additionally one or more heat expansion slots are cut in the laser cutting of step (b).

5. A tungsten carbide tipped circular saw blade made according to the method of claim 1.

6. A method according to claim 2 wherein one or more additional alternative arbors are but in the laser cutting of step (b) each said additional arbor being retained to the blade by one or more tag portions.

7. A method according to claim 2 wherein additionally one or more heat expansion slots are cut in the laser cutting of step (b).

8. A method according to claim 3 wherein additionally one or more heat expansion slots are cut in the laser cutting of step (b).

9. A tungsten carbide tipped circular saw blade made according to the method of claim 2.

10. A tungsten carbide tipped circular saw blade made according to the method of claim 3.

11. A tungsten carbide tipped circular saw blade made according to the method of claim 4.

* * * * *